United States Patent [19]
Hoyt et al.

[11] Patent Number: 5,244,061
[45] Date of Patent: Sep. 14, 1993

[54] AIR BRAKE STROKE LENGTH GAGE

[76] Inventors: Gordon C. Hoyt, P.O. Box 195, Little Hocking, Ohio 45742; Bryan L. Hoyt, 19003 Crestview Ct., Westfield, Ind. 46074

[21] Appl. No.: 869,192

[22] Filed: Apr. 13, 1992

Related U.S. Application Data

[63] Continuation of Ser. No. 592,329, Oct. 3, 1990, abandoned.

[51] Int. Cl.$^5$ .............................................. F16D 66/02
[52] U.S. Cl. ................................................. 188/1.11
[58] Field of Search ..................................... 188/1.11

[56] References Cited

U.S. PATENT DOCUMENTS

| | | | |
|---|---|---|---|
| 2,604,066 | 7/1952 | Salmon | 188/1.11 |
| 4,757,300 | 7/1988 | Sebalos | 188/1.11 |
| 4,776,438 | 10/1988 | Schandelmeier | 188/1.11 |
| 4,945,818 | 8/1990 | Ware | 188/1.11 |
| 4,991,310 | 2/1991 | Melia | 188/1.11 |
| 5,044,302 | 9/1991 | Goldfein et al. | 188/1.11 |

FOREIGN PATENT DOCUMENTS

1582567 1/1981 United Kingdom ............... 188/1.11

OTHER PUBLICATIONS

LGS Research Brochure "Best Stroke Indicator".

*Primary Examiner*—Matthew C. Graham
*Attorney, Agent, or Firm*—Robert A. Spray

[57] ABSTRACT

An air brake stroke length gage in cooperative arrangement with an air brake system. The gage consists of a stroke length indicator and a reference marker. The stroke length indicator is mounted upon and moves with the push rod of the brake system. The reference marker is fixably attached to the air brake system adjacent to the push rod at a distance which corresponds to the appropriate stroke length for the brake system when properly adjusted. When the brake is fully actuated, the spacial relationship between the stroke length indicator and the reference marker provides a visual indication of the brake system's adjustment.

10 Claims, 3 Drawing Sheets

AIR BRAKE STROKE LENGTH GAGE

This application is a continuation of application Ser. No. 07/592,329, filed Oct. 3, 1990, now abandoned.

BACKGROUND OF THE INVENTION

This invention relates generally to a push rod stroke length gage for use on the air brake systems of semi-trailer trucks.

Most air brake systems utilize a sealed housing, within which is a diaphragm attached to a push rod that extends from one side of the housing. The opposite side of the diaphragm creates an air cavity within the housing. The air pressure in the cavity rises when the brake pedal of the truck is depressed. The diaphragm deforms, and the air pressure rises, in proportion to the amount of force applied to the brake pedal. The push rod responds by moving with the diaphragm to engage the braking surfaces. When the air brake system is properly adjusted, the push rod will travel a distance on the order of one to two inches from the point where the brake is completely released to the point where it is fully actuated. Over time, as the brakes are repeatedly applied, the push rod travel distance increases, eventually requiring a readjustment of the brake system before the braking capability deteriorates to a level that renders the truck unsafe.

The brake systems of most trucks are normally examined on the basis of elapsed mileage since the last adjustment. Because the rate at which brake systems wear and fall out of adjustment varies between trucks, many trucks' brake systems have already deteriorated beyond what is considered safe when the brakes are examined, while other trucks' braking systems are still within tolerance and require no readjustment after the same elapsed mileage. Both of these unwanted situations should be avoided. An improvement that would allow the brakes to be quickly checked is desired in order to prevent potentially unsafe conditions from developing prematurely and to avoid wasting money for unnecessary down time. It is also desirable that such an improvement be inexpensive and easily adaptable to existing air brake systems.

The present invention answers the need for a simple device that can be used to quickly ascertain whether an air brake system is adjusted to Department of Transportation standards, at any time at any location and without the need for a mechanic or extraneous tools. The present invention is also inexpensive and easily adaptable to most air brake systems.

SUMMARY OF THE INVENTION

An air brake stroke length gage in cooperative arrangement with an air brake system includes a stroke length indicator and a reference marker. The stroke length indicator is attached to the push rod of the air brake system and disposed externally to the air brake housing. The stroke length indicator is movable away from the outer face of the air brake housing with movement of the push rod when the air brake system is actuated. The reference marker is mounted at a selected distance from the outer face of the air brake housing. After proper mounting and calibration, the relation between the stroke length indicator and the reference marker provides a visual indication of the air brake system's adjustment when the brake is actuated.

One object of the present invention is to provide an improved air brake stroke length gage.

Related objects and advantages of the present invention will be apparent from the following description.

DESCRIPTION OF THE PREFERRED EMBODIMENT

Figure 1:
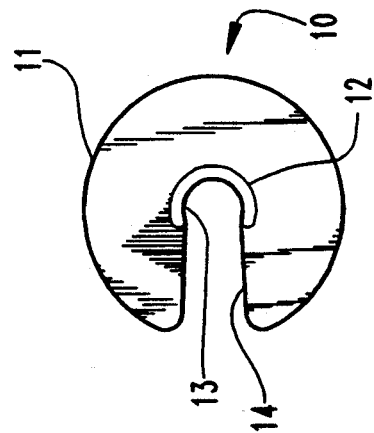
FIG. 1 is a front elevational view of a stroke length indicator according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
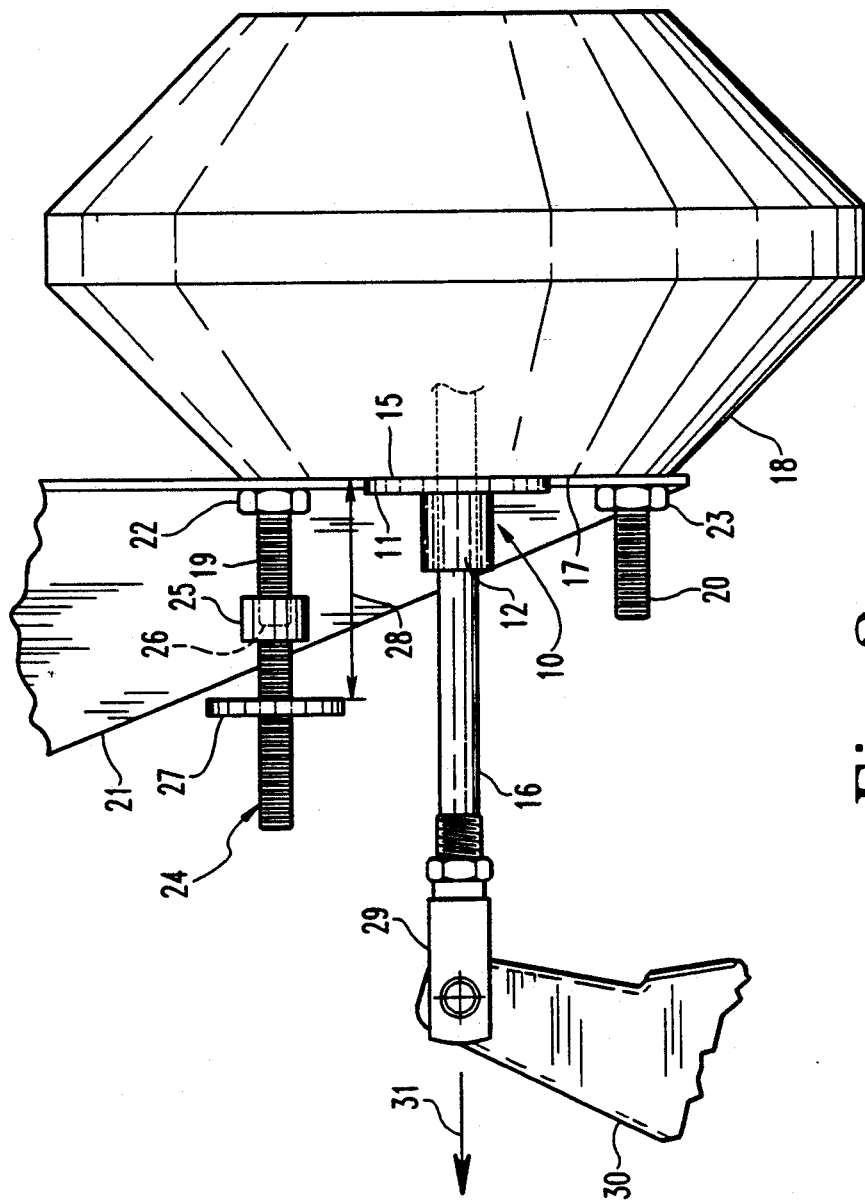
FIG. 2 is a side elevational view of an air brake stroke length gage according to the present invention in cooperative arrangement with an air brake system when the brake is completely released.
Figure 3:
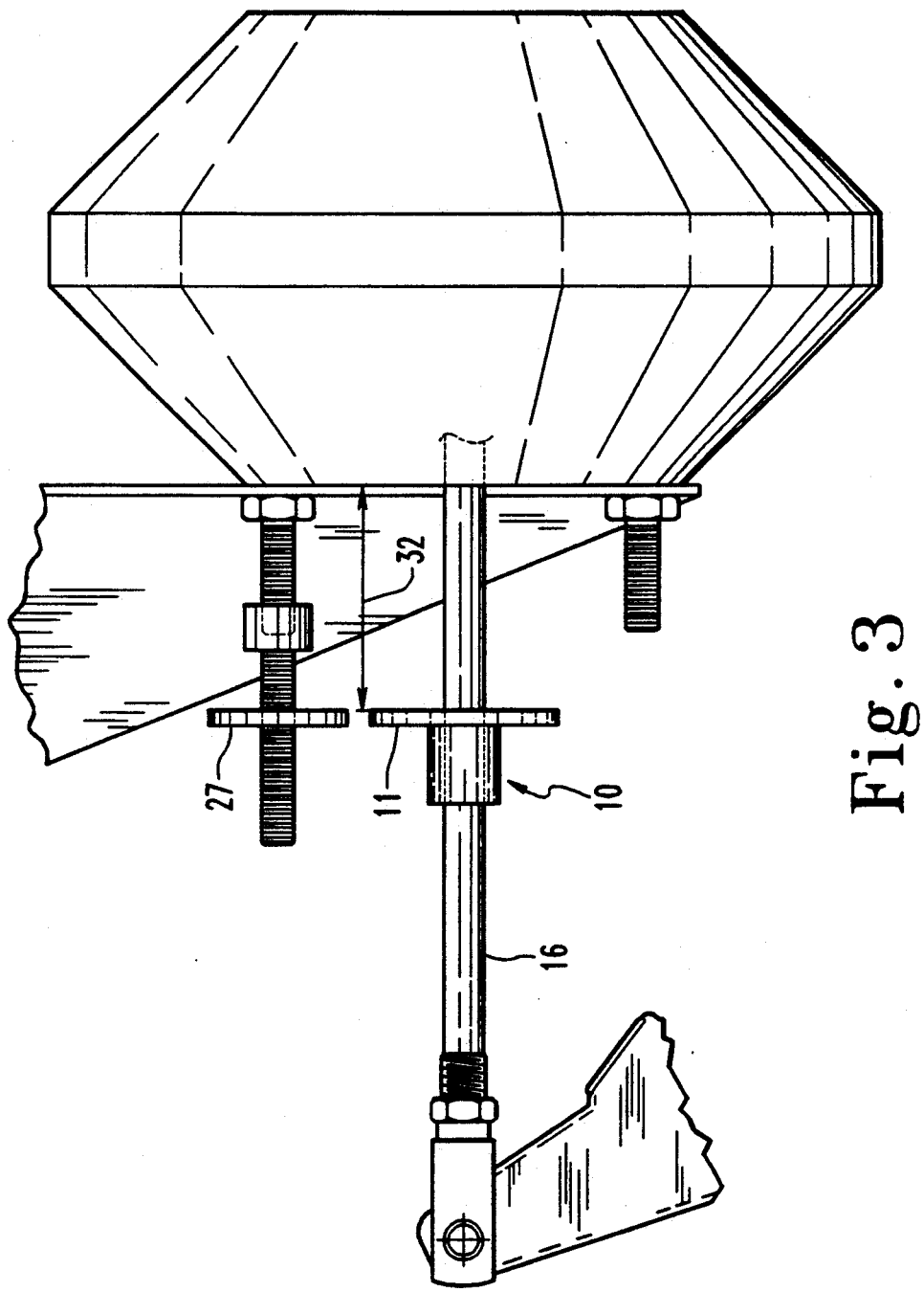
FIG. 3 is a side elevational view of the air brake stroke length gage of FIG. 2 when the brake is fully actuated and properly adjusted.
Figure 4:
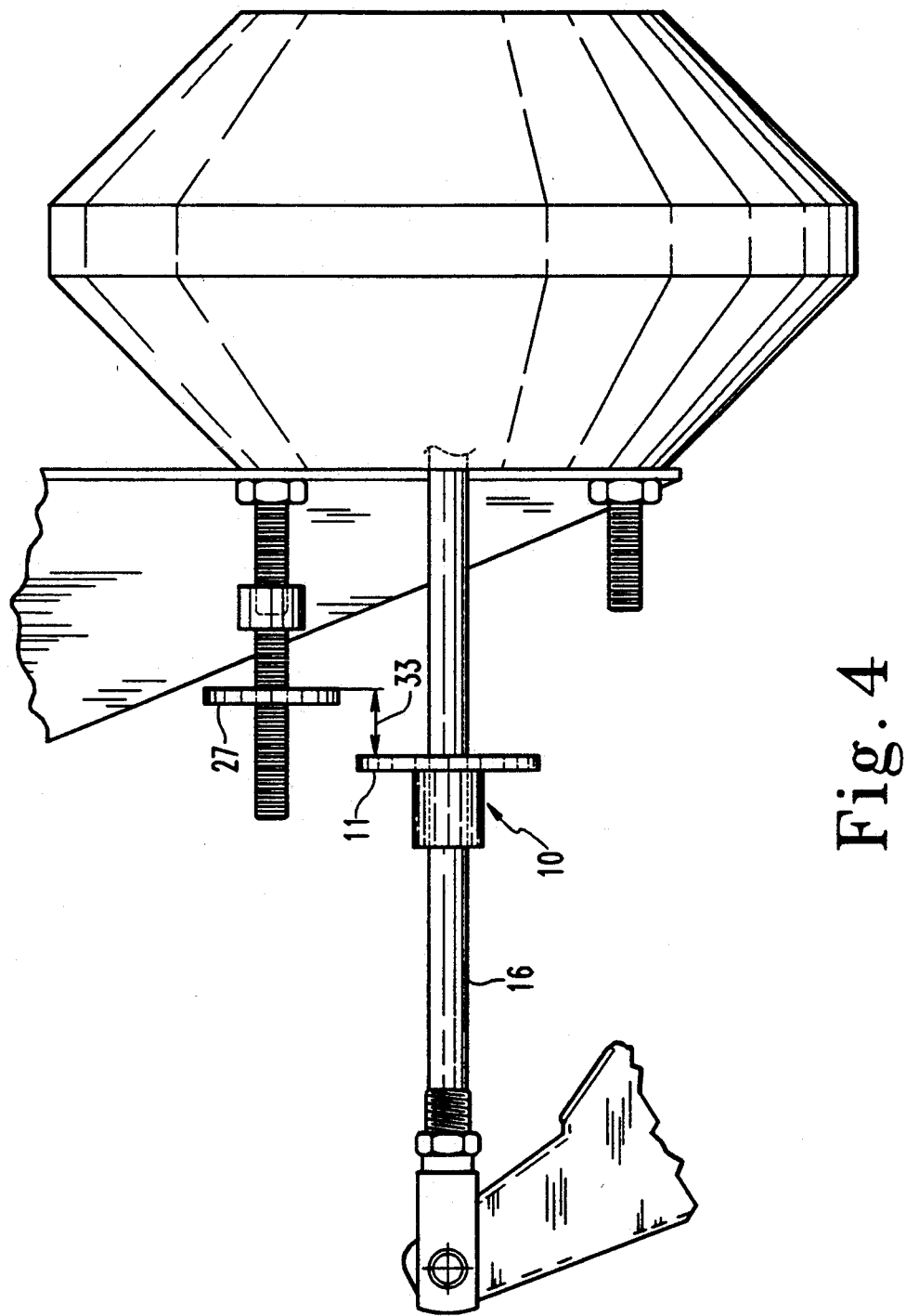
FIG. 4 is a side elevational view of the air brake stroke length gage of FIG. 2 when the brake is fully actuated and indicating a need to readjust the brake.
Figure 3:
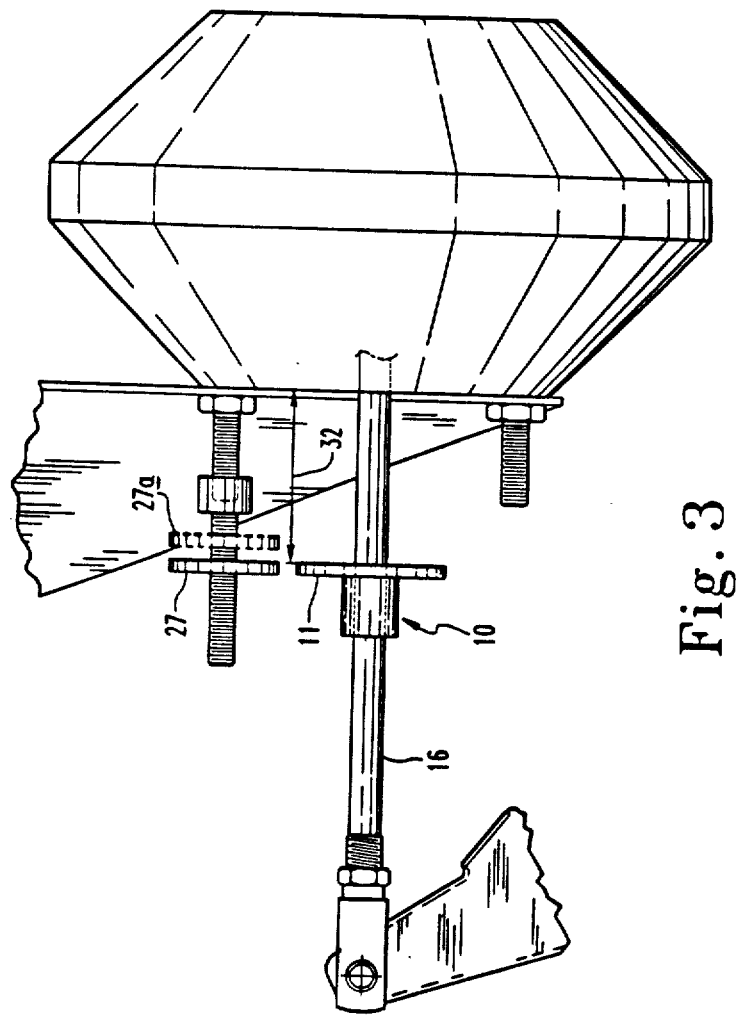

Referring now more particularly to the drawings, there is illustrated in FIG. 1 a stroke length indicator 10, which constitutes one portion of the present invention. The stroke length indicator 10 is preferably formed from plastic and defines a disk shaped outwardly radiating flange 11 and an open part-cylindrical collar 12. The relatively thin disc-shaped portion defines a plane which is substantially perpendicular to the push rod when the stroke length indicator 10 is attached thereto, as shown in FIGS. 2-4. The open collar 12 defines a semi-circular concave depression 13 which is intended to snugly receive the push rod of the air brake system (see FIG. 2). The outwardly radiating flange 11 defines an open slot 14 on one side, the slot 14 having a slight taper which enables the stroke length indicator 10 to be quickly and easily mounted upon a push rod without requiring the air brake system to be disassembled.

FIG. 2 shows an air brake stroke length gage in cooperative arrangement with an air brake system, only the relevant exterior portion of which is shown. The stroke length indicator 10 is releasably attached to a push rod 16 such that the abutment surface 15 of indicator 10 is contiguous to the outer face 17 of the air brake housing 18 when the brake is released. The air brake housing 18 includes externally-threaded mounting studs 19 and 20 that permit the housing 18 to be attached to bracket 21 by nuts 22 and 23, which in turn is connected to the truck axle. FIG. 2 also shows an externally-threaded stud extender 24 that includes an internally-threaded base 25 which has been threadably received upon the end 26 of mounting stud 19. The reference marker 27 is threadably received by stud extender 24 and is positioned from the outer face 17 of the air brake housing 18 at a distance 28 which corresponds to the proper stroke length distance for this particular air brake, as per the manufacturer's specification and Department of Transportation regulations. Reference marker 27 includes a relatively thin disk-shaped portion as shown, and is mounted in such a way that a plane defined by the relatively thin portion is substantially parallel to the plane defined by the stroke length indicator 10, as shown in FIGS. 2-4. The stroke length of an air brake system is defined as the travel distance of the push rod from where the brake system is released to where the brake system is fully actuated.

Push rod 16 is attached to a clevis 29, which in turn is connected to slack adjuster arm 30. When the brake system is actuated, push rod 16 advances slack adjuster arm 30 in the direction of arrow 31 and engages the braking surfaces, which are not shown. Stroke length indicator 10 moves with push rod 16 when the brake is actuated.

FIG. 3 shows a position of the air brake system and stroke length gage of FIG. 2 when the brake is applied, and the brake system is within specification. Calibration consists of the following steps: 1) attaching the stroke length indicator to the push rod when the brake is released such that the stroke length indicator abuts the outer face of the air brake housing; and 2) mounting the reference marker relative to the air brake housing at a specified distance from the housing (for example two (2) inches). After this is done, the truck driver or inspector can visually verify that the brake is properly adjusted by noticing that the outwardly radiating flange 11 of stroke length indicator 10 aligns with reference marker 27 when the brake is fully actuated. In other words, the reference marker should be adjusted such that the plane defined by the reference marker is substantially coplanar with the plane defined by the stroke length indicator when the brakes are fully actuated and the air brake system is properly adjusted, as shown in FIG. 3. In other words, push rod 16 moved a distance 32 which corresponds to the manufacturer's specification and Department of Transportation regulations.

While alignment between flange 11 and marker 27 represents an ideal condition of brake calibration, some slack in the brake system is necessary and results in flange 11 being positioned to the right of marker 27 when the brakes are applied. A tolerance zone is permitted without concern, but if flange 11 is too far to the right of marker 27, that condition indicates that the brake system is dragging (i.e., too tight). A secondary flange 27a (shown in broken line form) can be provided as a visual indicator of the permissible slack tolerance, such that if flange 11 falls on or between markers 27 and 27a, the status of the brake system is acceptable. Marker 27a may be either a separate piece or molded integrally with marker 27. Reference marker 27a is shaped similar to reference marker 27 so as to define its own geometrical plane. Reference marker 27a is mounted adjacent and parallel to reference marker 27 as shown in FIG. 3.

FIG. 4 shows the air brake system of FIG. 2 after the brake's adjustment has deteriorated. When there is a distance 33 between stroke length indicator 10 and reference marker 27 that exceeds the allowable tolerance for this particular brake system, even if only an eighth of an inch, the brake should be readjusted to conform to Department of Transportation regulations and the manufacturer's specifications.

While the invention has been illustrated and described in detail in the drawings and foregoing description, the same is to be considered as illustrative and not restrictive in character. For instance, FIGS. 2-4 show but one way the reference marker 27 can be fixably positioned with respect to outer face 17 of air brake housing 18 and stroke length indicator 10. Other possibilities include the use of adhesives to attach the reference marker, or the exploitation of other physical structures besides mounting studs 19 and 20. It being understood that only the preferred embodiment has been shown and described and that all changes and modifications that come within the spirit of the invention are desired to be protected.

What is claimed is:

1. An air brake stroke length gage in cooperative arrangement with an air brake system that includes an air brake housing having an outer face and a push rod that moves substantially perpendicularly with respect to the outer face over a travel distance when the brake system is activated, said air brake stroke length gage comprising:

a stroke length indicator having means for attaching to the push rod and a portion attached to said attaching means that is thin relative to the travel distance of the push rod so as to define a first geometrical plane that moves with the push rod, said portion being substantially perpendicular to the push rod and contiguous with the outer face of the air brake housing when said stroke length indicator is mounted on the push rod and the brake system is released;

a reference marker having a portion that is thin relative to the travel distance of the push rod so as to define a second geometrical plane;

means for mounting said reference marker at a selected distance away from the outer face of the air brake housing so that said first geometrical plane and said second geometrical plane are substantially coplanar when the brake system is fully actuated and properly adjusted; and wherein the distance relation of said second geometrical plane of said reference marker with respect to said first geometrical plane of said stroke length indicator provides a visual indication of the adjustment of said brake system when the brake system is fully actuated.

2. The air brake stroke length gage of claim 1 wherein said portion of said stroke length indicator is a flange that extends outward from said means for attaching.

3. The air brake stroke length gage of claim 2 wherein said portion of said reference marker is a flange that extends toward the push rod.

4. The air brake stroke length gage of claim 1 further comprising a second reference marker having a shape similar to said first reference marker so as to define a third geometrical plane and mounted adjacent said first reference marker such that said first geometrical plane of said stroke length indicator will be between said second geometrical plane of said first reference marker and said third geometrical plane of said second reference marker when the brake system is fully actuated and adjusted within acceptable tolerances.

5. An air brake stroke length gage in cooperative arrangement with an air brake system that includes an air brake housing and a push rod that moves over a travel distance when the brake system is activated, said air brake stroke length gage comprising:

a stroke length indicator having means for attaching to the push rod and an enlarged flange portion extending radially outward from said attaching means, said enlarged flange portion defining a first geometrical plane that is substantially perpendicular to the push rod;

a reference marker having an enlarged flange portion that extends toward the push rod and defines a second geometrical plane that is substantially parallel to said first geometrical plane;

means for mounting said reference marker such that said first geometrical plane and said second geometrical plane are substantially coplanar when the brake system is fully actuated and properly adjusted; and wherein the distance relation of said second geometrical plane of said reference marker with respect to said first geometrical plane of said stroke length indicator provides a visual indication of the adjustment of said brake system when the brake system is fully actuated.

6. The air brake stroke length gage of claim 5 wherein said enlarged flange portion of said stroke length indicator has a thickness, and said enlarged flange portion extends radially outward from said means for attaching a distance that is significantly greater than said thickness.

7. The air brake stroke length gage of claim 6 wherein said enlarged flange portion of said reference marker has a thickness, and said enlarged flange portion extends toward the push rod a distance that is significantly greater than said thickness.

8. The air brake stroke length gage of claim 5 further comprising a second reference marker having a shape similar to said first reference marker so as to define a third geometrical plane and mounted adjacent said first reference marker such that said first geometrical plane of said stroke length indicator will be between said second geometrical plane of said first reference marker and said third geometrical plane of said second reference marker when the brake system is fully actuated and adjusted within acceptable tolerances.

9. An air brake stroke length gage in cooperative arrangement with an air brake system that includes an air brake housing and a push rod that moves over a travel distance when the brake system is activated, said air brake stroke length gage comprising:

a stroke length indicator having means for attaching to the push rod and a disc-shaped surface;

a reference marker having a relatively thin portion that defines a geometrical plane substantially perpendicular to said push rod, said relatively thin portion has a first side facing the air brake housing and a second side facing away from the air brake housing;

means for mounting said reference marker such that said disc-shaped surface is located on said first side of said relatively thin portion when the brake system is released, but located a distance away from said geometrical plane on said second side when the brake system is fully actuated and outside of acceptable tolerances; and wherein the distance relation of said stroke length indicator with respect to said geometrical plane of said reference marker provides a visual indication of the adjustment of said brake system when the brake system is fully actuated.

10. The air brake stroke length gage of claim 9 further comprising a second reference marker having a shape similar to said first reference marker so as to define a second geometrical plane and mounted adjacent said first reference marker such that said disc-shaped surface of said stroke length indicator will be between said first geometrical plane of said first reference marker and said second geometrical plane of said second reference marker when the brake system is fully actuated and adjusted within acceptable tolerances.

* * * * *

UNITED STATES PATENT AND TRADEMARK OFFICE
CERTIFICATE OF CORRECTION

PATENT NO. : 5,244,061
DATED : September 14, 1993
INVENTOR(S) : Gordon C. Hoyt, et. al.

It is certified that error appears in the above-indentified patent and that said Letters Patent is hereby corrected as shown below:

Fig. 3, of the drawings should be deleted to appear as shown on attached sheet.

Signed and Sealed this

Seventh Day of June, 1994

Attest:

BRUCE LEHMAN

Attesting Officer     Commissioner of Patents and Trademarks